(12) United States Patent
Duarte et al.

(10) Patent No.: US 7,172,316 B2
(45) Date of Patent: Feb. 6, 2007

(54) LIGHTING OR INDICATING APPARATUS EQUIPPED WITH A COMPLEMENTARY MODULE, FOR A MOTOR VEHICLE

(75) Inventors: Marc Duarte, Bobigny Cedex (FR); Jean-Marc Nicolai, Bobigny Cedex (FR); David Myotte, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 41 days.

(21) Appl. No.: 10/635,358

(22) Filed: Aug. 6, 2003

(65) Prior Publication Data
US 2004/0042229 A1  Mar. 4, 2004

(30) Foreign Application Priority Data
Aug. 8, 2002 (FR) .................................. 02 10124

(51) Int. Cl.
*F21K 27/00* (2006.01)
(52) U.S. Cl. ...................... 362/265; 362/548; 362/549; 362/507; 362/546; 315/77; 315/80; 315/82
(58) Field of Classification Search ................ 362/546, 362/548, 549, 265, 507, 401; 315/77, 82, 315/80
See application file for complete search history.

(56) References Cited

U.S. PATENT DOCUMENTS

| | | | |
|---|---|---|---|
| 4,182,532 A * | 1/1980 | Walker, Sr. ................. | 296/210 |
| 4,674,015 A | 6/1987 | Smith ......................... | 362/217 |
| 5,107,405 A | 4/1992 | Makita ....................... | 362/467 |

(Continued)

FOREIGN PATENT DOCUMENTS

DE  41 33 002 A1  4/1993

(Continued)

OTHER PUBLICATIONS

French Patent Office; Preliminary Search Report: FA 624274; correponding to French Patent Application No. FR 0210124; Apr. 23, 2003; (2 pp.).

*Primary Examiner*—Sandra O'Shea
*Assistant Examiner*—Jacob Y. Choi
(74) *Attorney, Agent, or Firm*—Morgan & Finnegan LLP

(57) ABSTRACT

Lighting or indicating apparatus for a motor vehicle comprises in particular a light emitting element which includes a reflector, a light source, and a casing which defines a set of faces, comprising side, lower and upper faces. There is, optionally, at least one opening formed in at least one of the said faces and having removable obturating means.

The lighting or indicating apparatus is adapted to be combined with at least one complementary module with the aid of at least one pair of assembly elements comprising a guiding slide and a projecting element. The projecting element is adapted to be inserted at least into one end of the guiding slide with which it is associated, and to slide in the said guiding slide. Each of the assembly elements of one pair of assembly elements is disposed either on the headlight element or on the module. The two assembly elements in one assembly pair are not both disposed on the light emitting element; nor are they both disposed on the module. The module is a single electrical connector, and the lighting or indicating apparatus has a single receiving element for the connector of the complementary module.

25 Claims, 2 Drawing Sheets

U.S. PATENT DOCUMENTS

| | | | |
|---|---|---|---|
| 5,119,275 A | 6/1992 | Makita | 362/459 |
| 5,188,444 A | 2/1993 | Makita | 362/519 |
| 5,343,370 A | 8/1994 | Ohashi et al. | 362/459 |
| 5,382,876 A | 1/1995 | Sugasawa et al. | 315/82 |
| 5,434,763 A | 7/1995 | Hege et al. | 362/265 |
| 5,529,506 A | 6/1996 | Onoda | 439/95 |
| 5,562,339 A | 10/1996 | Tanaka et al. | 362/519 |
| 5,597,232 A | 1/1997 | Ohashi et al. | 362/265 |
| 5,607,228 A | 3/1997 | Ozaki et al. | 362/263 |
| 5,653,528 A | 8/1997 | Schmidt | 362/226 |
| 5,678,916 A | 10/1997 | Watanabe et al. | 362/465 |
| 5,700,079 A | 12/1997 | Woerner et al. | 362/496 |
| 5,727,873 A | 3/1998 | Tyson | 362/294 |
| 5,838,109 A | 11/1998 | Kobayashi et al. | 315/58 |
| 5,879,073 A | 3/1999 | Hori et al. | 362/344 |
| 5,895,113 A | 4/1999 | Ozaki et al. | 362/546 |
| 5,975,715 A | 11/1999 | Bauder | 362/226 |
| 6,008,584 A | 12/1999 | Kodaira et al. | 315/82 |
| 6,043,614 A | 3/2000 | Tessnow et al. | 315/291 |
| 6,072,277 A | 6/2000 | Yamamoto et al. | 315/82 |
| 6,102,550 A | 8/2000 | Edwards, Jr. | |
| 6,123,439 A | 9/2000 | Hiranaka et al. | 362/459 |
| 6,161,951 A * | 12/2000 | Yoneyama et al. | 362/516 |
| 6,176,604 B1 | 1/2001 | Dubrovin et al. | 362/539 |
| 6,309,089 B1 | 10/2001 | Yoneyama | 362/263 |
| 6,322,239 B1 | 11/2001 | Nitta et al. | 362/543 |
| 6,364,515 B1 | 4/2002 | Daub et al. | 362/548 |
| 6,382,823 B1 * | 5/2002 | Kibayashi | 362/548 |
| 6,390,657 B1 | 5/2002 | Billot | 362/519 |
| 6,474,856 B2 | 11/2002 | Billot | 362/548 |
| 6,536,920 B2 * | 3/2003 | Imachi et al. | 362/265 |
| 6,540,385 B2 | 4/2003 | Ikeda et al. | 362/512 |
| 6,550,935 B1 * | 4/2003 | Ueno et al. | 362/263 |
| 6,672,747 B2 | 1/2004 | Yamaguchi et al. | 362/549 |
| 6,690,114 B2 | 2/2004 | Nakayama et al. | 315/77 |
| 6,734,632 B2 | 5/2004 | Yamaguchi | 315/57 |
| 6,749,327 B2 * | 6/2004 | Nishiyama | 362/548 |
| 6,767,121 B2 | 7/2004 | Bost et al. | 362/521 |
| 2001/0030877 A1 | 10/2001 | Billot | 362/548 |
| 2002/0067617 A1 | 6/2002 | Imachi et al. | |
| 2002/0067619 A1 | 6/2002 | Ikeda et al. | 362/512 |
| 2002/0155738 A1 | 10/2002 | Ohsawa et al. | 439/98 |
| 2004/0184281 A1 | 9/2004 | Duarte et al. | 362/509 |

FOREIGN PATENT DOCUMENTS

| | | |
|---|---|---|
| DE | 196 54 190 | 4/1993 |
| EP | 1 136 749 A1 | 9/2001 |
| FR | 2 769 072 | 9/1997 |
| WO | 02/10640 A1 | 2/2002 |

* cited by examiner

PRIOR ART

LIGHTING OR INDICATING APPARATUS EQUIPPED WITH A COMPLEMENTARY MODULE, FOR A MOTOR VEHICLE

FIELD OF THE INVENTION

The present invention relates to lighting or indicating apparatus for motor vehicles, the said apparatus consisting essentially of a light emitting element assembled with a complementary module which takes the form of a casing. The complementary module includes a set of electrical and/or electronic and/or mechanical elements which are matched directly to the operation of the light emitting element or to the performance of accessory and/or complex functions associated with the said element. In one particular and preferred example of the invention, which will be described more particularly in detail, the complementary module is an element of the ballast type.

An essential object of the invention is to propose one particular embodiment of an assembly of the light emitting element with the complementary module. This embodiment has advantages, in particular, in regard to ease of assembly of the light emitting element with the complementary module, and, to a lesser extent, in regard to the size of the complementary module when it is assembled with the light emitting element; moulds used in the manufacture of the said light emitting element; and again, sealing at various levels of the lighting or indicating apparatus.

The field of the invention is, in general terms, that of lighting or indicating apparatus for motor vehicles.

BACKGROUND OF THE INVENTION

In the above context, various types of apparatus are known, among which (without limitation) may be cited the following:

- position lights of low intensity and short range;
- short range, passing or dipped beam headlights, of greater intensity and with a longer range, covering approximately 70 meters of the road ahead and used essentially at night, the distribution of their light beams being such that it avoids dazzling the driver of a vehicle travelling in the opposite direction;
- long range or main beam headlights, and long range complementary driving lights, having a zone of vision over the road of approximately 200 meters; these lights must be extinguished when passing another vehicle, in order not to dazzle its driver;
- improved headlights of the so-called dual-function type which combine the functions of passing lights and main beam lights, by incorporating a removable screen;
- anti-fog headlights, or foglights;
- stop lights; and
- direction indicators.

The combination, according to the invention, of a light emitting element with a complementary module may be obtained with any one of these devices whatever. The complementary module may in this connection for example contain an electronic circuit board of the light control system (LCS) type which serves to produce the so-called complex functions (FBL, DBL, ERL, Cordy and so on) for the apparatus with which the said electronic circuit board is associated. The complementary module may also include a control circuit board for governing a mechanical element of the actuator type. Nevertheless, the invention will be described more particularly with reference to a headlight apparatus of the passing beam type with a complementary module of the ballast type.

In the context of the invention, a ballast is a particular complementary module which is preferably contained in a headlight apparatus of the passing beam type which uses a discharge lamp as its light source. More particularly, in the invention, reference is made to ballasts of the high intensity discharge (HID) type, which are necessary in order to create and maintain an electric arc used in xenon lamps. An electronic module produces a high voltage in the ballast in order to obtain the electrical arc in the light source which is used. In this type of headlight, a complementary module of the ballast type is therefore indispensable in order to provide the energy which is necessary for proper operation of the headlight.

However, integration of such a module into the interior of the headlight apparatus must have regard to a number of constraints, namely the following:

- it must be done by means of as simple as possible an assembly operation;
- it must occupy little space;
- in order to prevent any damage to the elements contained within the ballast, it must have regard to the high temperatures which can occur in operation of the headlight apparatus;
- it must take into account the need for transmissions of electrical signals between the various elements of the headlight apparatus; and
- the association between the headlight element and the complementary module must not give rise to sealing problems in respect of either one of these components.

In the current state of the art, it has in particular been proposed to provide a headlight apparatus which does attempt to have regard to these various constraints. Such a headlight apparatus is shown diagrammatically in FIG. 1 of the accompanying drawings.

In FIG. 1 a headlight apparatus 100 consists essentially of a headlight element 101 and a ballast 102 of the HID type. In the headlight element 101 there is, in particular, a reflector 106 in which a light source 103, of the discharge lamp type, is placed. The light source 103 produces a light beam which passes out of the headlight element 101 at the level of an output surface 108 which constitutes the front part of the headlight element 101. The light source 103, which rests on a lampholder element 104, is connected to a high tension module 105 which supplies power to it.

The high tension module is energised by means of a first electrical link 107 constituting an input lead, which is preferably screened and which passes out of the headlight element 101 at the level of a first aperture formed in a lower face 109 of the headlight element 101, in which a first connector receiving element 110 is located. This first receiving element 110 is adapted to receive a first connector 111 of the ballast 102. The latter includes a second connector 112 which is associated with a second connector receiving element 113 disposed at the level of a second aperture formed in the lower face 109 of the headlight element 101. A second electrical link 117, constituting an output lead, is connected to the second connector 112; it enables various electrical signals to be carried, in particular a power supply signal for the ballast and various control signals coming from the vehicle. Accordingly, the term "lead" as used in this description and the claims, is to be understood to mean a bundle or other connector consisting of one or more electrical conductors.

Fastening between the ballast 102 and the headlight element 101 is obtained between the lower face 109 of the headlight element 101 and an upper face 115 of the ballast 102, at the level of an aperture 114 which is formed in at least part of the lower face and of the rear face of the headlight element 101, that is to say approximately under the assembly that consists of the reflector 106, lampholder element 104, and high tension module 105. The ballast 102 is fixed on the headlight element 101 by means of at least two screws 116, which are disposed vertically in holes provided for this purpose.

The choice of the arrangement of the ballast 102 is made, in particular, by considering the least hot zone of the headlight apparatus. Generally, this zone corresponds to the zone which is situated below the reflector element 101, which is also quite accessible and in consequence facilitates assembly. It is at this point that the heat produced by the light source 103 is least severe, and the lower portion of the headlight element 101 is easier of access than, for example, the rear portion.

In the invention, assembly of the headlight element and complementary module together, as just described, does have a certain number of disadvantages, namely the following. To start with, the fact that the connector receiving elements 110 and 113 are disposed vertically on the rear face 109 of the headlight element 101 poses a first problem. This is that the mould in which the headlight element 101 is made is open in a horizontal direction, and the need to be able to dispose the connector receiving elements in vertical positions makes it necessary to provide drawers in the mould used. Since this mould is used for the assembly of headlight elements including those which operate with a light source of the halogen type, this disadvantage, besides imposing a penalty in terms of complexity in manufacture of the mould, involves an undesirable increase in the cost of assembly of the headlight elements.

The presence of two connectors is also a problem in itself. In this connection, the more connectors are provided, the more delicate is the assembly operation and the longer it takes to perform.

A third problem encountered with headlight apparatus in the state of the art, when associated with a complementary module, is that they are relatively large, the complementary module 102 having a substantial height because of the way in which it is designed.

A fourth problem met with in headlight apparatus in the state of the art, when associated with a complementary module, lies in the complexity of the assembly operation, in particular by reason of the fastening means employed. In the state of the art as described above, it is necessary to make use of at least two screws to secure together the headlight element 101 and the ballast 102. The fewer screws there are, the shorter will be the time taken for assembly and the simpler will be the assembly operation.

DISCUSSION OF THE INVENTION

The apparatus according to the invention responds to the problems just discussed. In general terms it is proposed in the invention to provide a lighting or indicating apparatus associated with a complementary module, which is very easy to assemble as compared with those in the state of the art, and which, in particular practical embodiments, eliminates the need to provide drawers for the positioning of the connector receiving elements, in the mould in which the lighting or indicating apparatus is made. In addition, it is possible to provide an arrangement of the complementary module which enables the increase in overall volume of the lighting or indicating apparatus to be limited, especially in the height dimension, while improving its sealing. The number of fastening means is then limited. Finally, the electrical links are organised differently in the invention so that, from now on, only a single connector receiving element need be used on the lighting or indicating apparatus, together with a single connector which is on the complementary module.

To this end, in the invention, a lighting and/or indicating apparatus is provided having at least one guiding slide and a projecting element which is adapted to be inserted in the guiding slide and to slide in it. In one particular embodiment of the apparatus, the guiding slides are disposed on the lighting or indicating apparatus, and the associated projecting elements are provided on the complementary module, though the opposite may be the case in other embodiments of the apparatus according to the invention. The sliding of the projecting elements in the guiding slides takes place until the complementary module reaches a stop position corresponding to its position of assembly on the headlight element. In various embodiments, the connector and its receiving element fit matingly together at the level of the stop position, the mating engagement being able to take place automatically at the end of the straight-line movement of the projecting elements in the guiding slides.

In one particular example of an embodiment of the apparatus according to the invention, an opening is formed below the reflector, and an organisation of the various elements of the device such as the complementary module no longer projects through the opening, or projects only a minimum amount, at least in the height dimension. It is also arranged that the complementary module and the headlight element are secured together by means of a single fastening element, for example a screw which is disposed at the level of a contact plane defined by the front face of the complementary module and by a side face of the opening. A single connector and its receiving element are also disposed on the contact plane.

According to the invention in a first aspect, lighting or indicating apparatus for a motor vehicle, comprising in particular a light emitting element, which includes in particular a reflector, a light source, and a casing which defines a set of faces, comprising side, lower and upper faces and, optionally, at least one opening formed in at least one of the said faces and having removable obturating means, is characterised in that the lighting or indicating apparatus is adapted to be combined with at least one complementary module with the aid of at least one pair of assembly elements comprising a guiding slide and a projecting element, the projecting element being adapted to be inserted at least into one end of the guiding slide with which it is associated, and to slide in the said guiding slide, each of the assembly elements of one pair of assembly elements being disposed either on the headlight element or on the complementary module, the two assembly elements in one assembly pair not being disposed together on the light emitting element or on the complementary module, the complementary module being provided with a single electrical connector, and the lighting or indicating apparatus being provided with a single receiving element for the connector of the complementary module.

The lighting or indicating apparatus according to the invention may also have one or more of the following features:

it has two pairs of assembly elements;

each sliding guide is disposed on the light emitting element, and each projecting element in one pair of assembly elements is disposed on the complementary module;

the complementary module is associated with the lighting or indicating apparatus on at least one of the outer or inner walls of the casing of the light emitting element, or on the outer or inner wall of a removable obturating means of the said casing;

the complementary module is a ballast of the HID type or a module comprising at least one electronic circuit board for performing at least one function associated with the headlight element;

the electrical connector of the complementary module is situated on the lateral face of the said module, which is of approximately parallelepiped form;

the complementary module is provided with at least one projecting element which is an integral part of the casing of the said module;

the complementary module is of approximately parallelepiped form, and it is provided with two projecting elements which are an integral part of the casing of the said module and which takes the form of projections on at least part of two opposed edges of the same face of the casing of the module;

the connector and the connector receiving element are so configured as to be in electrical contact once the mating engagement of the slide or slides and the projecting element or elements has been achieved;

the connector receiving element and the connector fit one inside the other when at least one projecting element of one assembly pair is at the end of its course of travel in the guiding slide with which it is associated;

the complementary module and the light emitting element are fixed together by fastening means once the said slide has, or slides have, come into mating engagement with the projecting element or elements, the said fastening means being selected from the group consisting of a single screw, means for clipping the complementary module on the light emitting element, and a spring;

the connector, and/or the receiving element for the connector, include or are associated with means for centring the connector with respect to the connector receiving element, for example guide pins or the use of two guiding slides, in facing relationship and chamfered;

the casing of the light emitting element includes an opening formed in at least a portion of a rear side face, and in at least part of the lower face of the light emitting element, and in that the light emitting element includes at least one connector receiving element disposed in an aperture formed in the rear face of the light emitting element, at the level of the opening, at least one of the connector receiving elements being adapted to received a connector disposed on the complementary module of the light emitting element;

the guiding slides are disposed on the walls of the light emitting element which define the opening;

the apparatus includes a first seal of the lip seal type, which is disposed in the opening in order to envelop a connecting end of the complementary module and thereby to seal the headlight apparatus;

the apparatus includes a second seal disposed in the opening in order to come into partially enveloping relationship with the receiving element of the connector, and thereby to seal the joint between the light emitting element and complementary module;

the apparatus includes a third seal disposed between a heat sink, which constitutes a lower portion of the complementary module, and a cap element of the complementary module;

the apparatus includes a single power supply input for receiving a set of signals from outside the lighting or indicating apparatus, the said signals being transmitted via a first conductive link to the receiving element of the connector, a second conductive link internal to the light emitting element, for ensuring the transmission of signals between the receiving element of the connector and a high tension module associated with the light source, the first conductive link being preferably an unscreened lead, and the second conductive link being preferably a screened lead.

According to the invention in a second aspect, a method of assembling the complementary module to the lighting or indicating apparatus by means of the pair or pairs of assembly elements according to one of the preceding Claims, is characterised in that, as the module and the lighting or indicating apparatus are being assembled together, their mechanical and electrical connections are made simultaneously.

According to the invention in a third aspect, an electronic module for a motor vehicle lighting or indicating apparatus, of the type consisting of a ballast or an element containing at least one electronic circuit board for performing at least one function associated with the said headlight, is characterised in that the said module has a single connector.

Preferably, the said module is in the approximate form of a parallelepiped, and the single connector is disposed on one of its side faces.

Preferably, the said module has the approximate form of a parallelepiped, and it is provided with at least one projecting element which is an integral part of the casing of the said module, and in particular with two projecting elements which are an integral part of the casing of the said module, and which are in the form of lugs on at least a portion of two opposed edges of a common face of the casing of the module.

According to the invention in a fourth aspect, a motor vehicle is equipped with a headlight apparatus comprising a complementary module and including at least one of the above mentioned features of the invention.

The invention and its various applications will be understood more clearly on a reading of the following detailed description and study of the drawings that accompany it. The latter are given only by way of illustrative and in no way limiting illustration of the invention. In particular, the example shown represents the case in which a headlight element and a complementary module are assembled at the level of a lower face of the headlight element, at the level of an opening which is provided for that purpose. However, in other embodiments, this combination may be obtained at the level of other faces of the headlight element, including the interior of the headlight element, with or without the presence of an opening.

DESCRIPTION OF SOME PREFERRED EMBODIMENTS OF THE INVENTION

The various elements common to two or more Figures of the drawings keep the same reference signs in the various Figures in which they appear.

Figure 2:
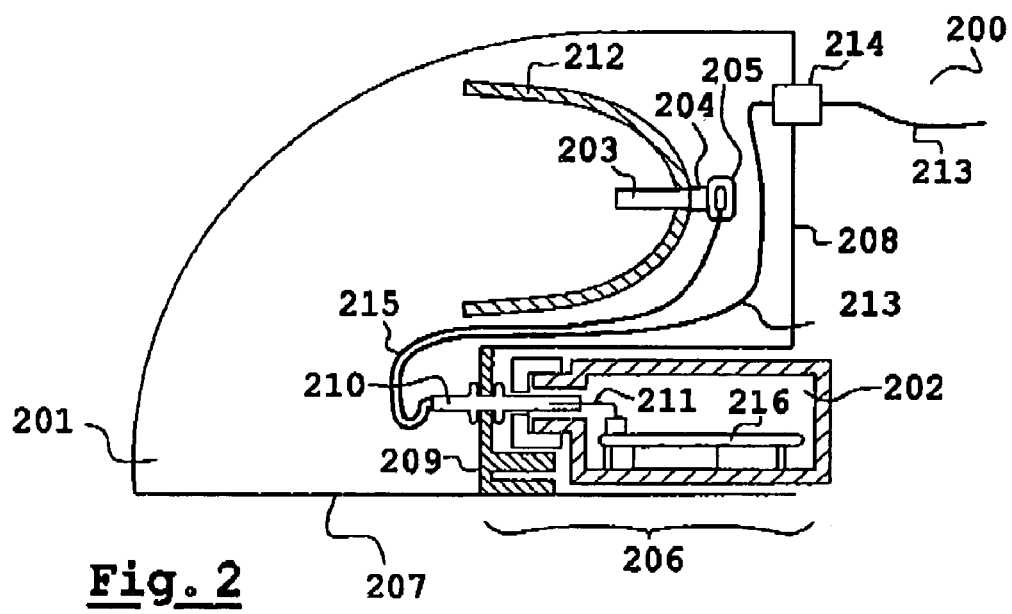
FIG. 2 is a diagrammatic cross sectional front view of a combination of a headlight apparatus with a complementary module according to the invention.

FIG. 2 shows an apparatus 200 according to the invention in vertical cross section. It consists in particular of a headlight element 201 and a complementary module 202 of the HID ballast type, which can in particular include an electronic control circuit board 216. As in the prior art as discussed above, the headlight element 201 contains, in particular, a reflector 212 in which a light source 203 of the discharge lamp type is fitted. The light source 203 produces a light beam which passes out of the headlight element 201 at the level of an output surface which constitutes the front part of the headlight element 201. The light source 203, supported on a lamp holder element 204, is connected to a high voltage module 205 which supplies it with power.

An opening 206 is formed in at least part of a lower surface 207 and a portion 209 of a rear surface 208 of the headlight element 201, the orientation of these surfaces being defined in relation to a normal working position of the headlight apparatus on a motor vehicle, the outlet surface for the light beam constituting the front face of the headlight element. The opening 204 is of substantially parallelepiped form in the example described, but its form could be different in other embodiments of the invention.

Limitation of the overall size of the headlight apparatus 200 with the added complementary module 202 (which is of the ballast type) is sought. Two solutions are proposed for this purpose, in which each of these two solutions may be applied by itself, or in association with the other solution, in different versions of the headlight apparatus 200.

The first of these solutions consists in arranging, for example by clipping and with a little clearance, a connector receiving element 210 on the rear portion 209 of the headlight element 201 which is situated at the level of the opening 206. The junction of the receiving element 210 with a connector 211 of the ballast 202 can thus be made in a vertical plane or so-called contact plane or junction plane, that is to say by displacing the ballast 202 in a horizontal direction towards the headlight element 201, and no longer a vertical direction as was the case in the prior art example described with reference to FIG. 1.

Thus, the size in the height dimension, which was formerly due to the presence of the connector receiving element and the connector itself in a horizontal junction plane, has disappeared. With such an arrangement of the connector 211 and its receiving element 210, the overall height of a headlight apparatus which includes a complementary module is, with advantage, reduced.

A slight increase in the width of the apparatus could however accordingly occur. This is why, in the invention, a second solution is proposed which may be applied in complement to the first solution, and in which the opening 206 is slightly extended horizontally, that is to say it is advanced a little further under the reflector 212. In this connection, if it is impossible to increase the size of the opening in the height dimension without coming too close to the reflector 202, there is nothing to prevent its being extended in the length dimension in order to make it deeper.

In addition, the fact that from now on a connector 211 and its receiving element 210 are disposed horizontally enables the connection to the improved in terms of sealing; in this connection, water of condensation within the headlight element 201 may sometimes penetrate along a vertical connection but not along a horizontal connection.

Moreover, in the invention there is proposed a way of organising various electrically conductive connections which enable them to be limited to the single connector 211 and its receiving element 210. In this regard, a first electrical connection 213 is provided. constituting an input lead, which carries a set of power supply and control signals from outside the headlight apparatus 212 to the receiving element 210 of the connector 211. This first electrical connection 213 enters into the headlight element 201 at the level of an aperture 214 to be connected on the receiving element 210 A branch at the level of the receiving element 210 enables a second electrical connection 215 to be obtained in the form of a screened output lead supplying power 10 the light source 203. There are therefore an input lead and an output lead which are assembled together at the level of a single connector, the connector thereby effecting the combination of a screened lead with an unscreened lead.

Figure 3:
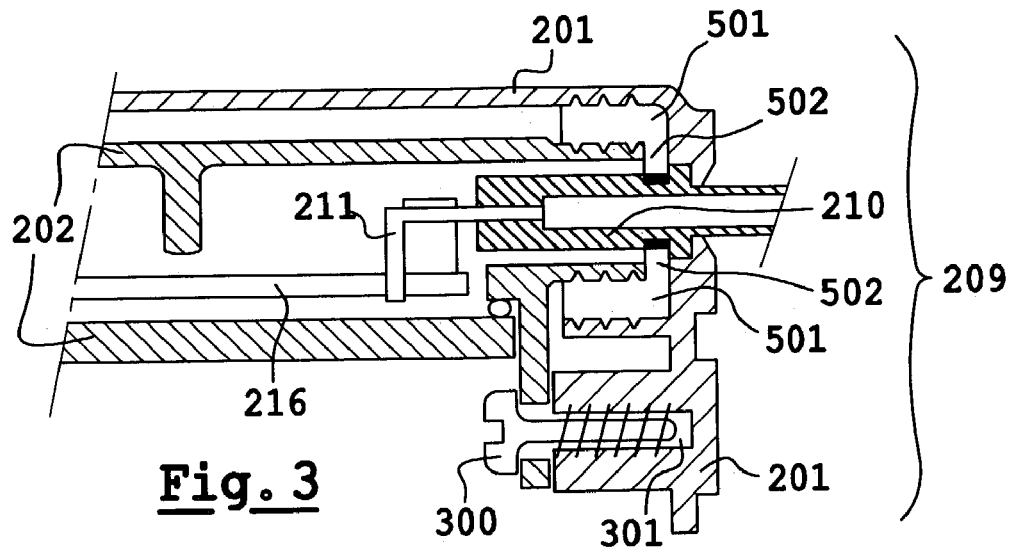
FIG. 3 is a more detailed view showing various elements which are interposed between the combination of the headlight apparatus and the complementary module.
Figure 4:
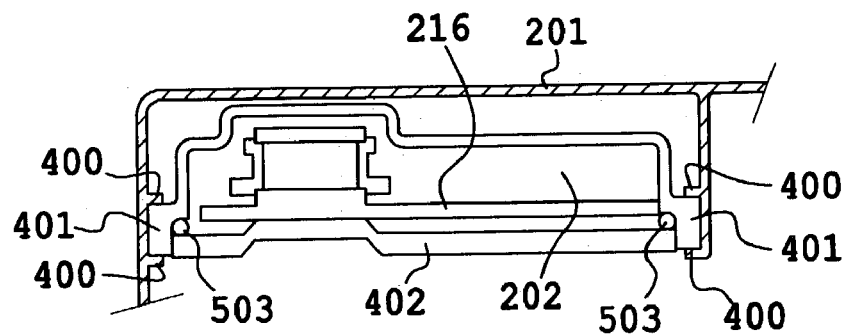
FIG. 4 is a diagrammatic, cross sectional view seen from the left, of a combination of a headlight apparatus and a complementary module according to the invention.
Figure 5:
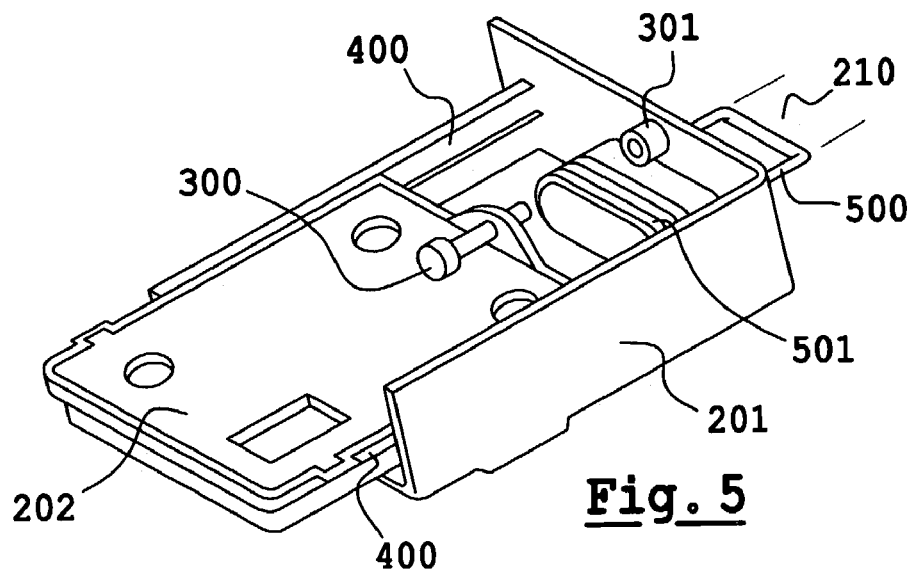
FIG. 5 is a diagrammatic perspective view of part of the apparatus according to the invention.

Reference is now made essentially to FIGS. 3, 4 and 5, which show in particular the various elements interposed in the fixing together of the ballast 202 and the headlight element 201.

Figure 1:
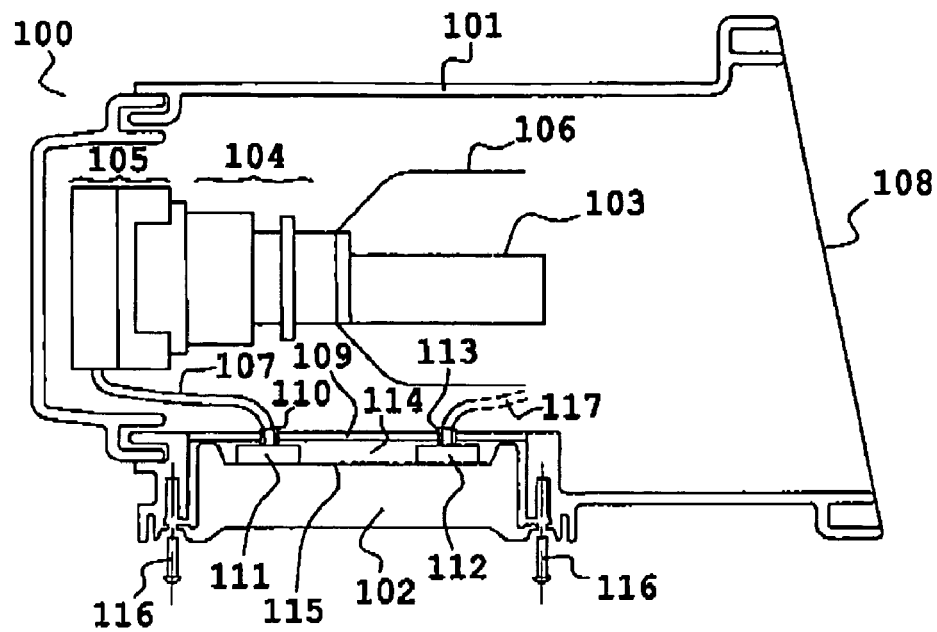
FIG. 1, which has already been described above, shows a combination of a headlight apparatus and a complementary module in the state of the art.

FIG. 3, apart from showing various elements already present in FIG. 1, shows a screw 300, preferably of the self-tapping type which, after having been introduced into a fastening element situated in the lower portion of the ballast 202, is inserted into the portion 209 of the rear face, at the level of the opening 206, of the headlight element 201 (which is shown here in cross section) and the lateral portion of the ballast 202 (part of which is shown), serving as a junction plane. The fastening made by the screw 300 and threaded bore 301 is preferably disposed in the centre of the width as shown in FIG. 5. It is disposed below the connection which is established between the connector 211 and its receiving element 210.

An auto-centring device for the connector 211 on the receiving element 210 is provided. This appears in FIG. 5 in the form of two centring pins 500 disposed on the receiving element 210. These centring pins are arranged to orientate the connector 211 and its various electrical connections correctly towards the appropriate apertures in the receiving element 210 when the headlight element 201 and the ballast 202 are mated together. In other embodiments, the centring pins may be disposed on the connector 211.

In a further embodiment, the screw 300 could be replaced by another mechanical fastening means, for example a thrust spring which would be disposed behind the ballast 202, and which would exert on the latter a horizontal thrust so as to keep the connection between the connector 211 and its receiving element 210 in operation.

In accordance with the invention, guide rails 400, or slides, which can be seen in FIGS. 4 and 5, are provided on the headlight element 201 at the level of the opening 206. They are adapted to guide the horizontal straight-line motion of the ballast 202 with a minimum or clearance while it is being installed in the apparatus 200, in order to facilitate assembly. Projecting elements 401, or lugs, of sufficiently large size to enter into the guide rails 400, are provided for this purpose On the side walls of the ballast 202. The guide rails 400 also act as supports for the ballast 202, and this enables there to be only one screw 300.

In various versions of the apparatus according to the invention, one or more pairs of assembly elements may be provided, each pair consisting of a guiding slide 400 and a projecting element 401. The guide slides may be disposed on the headlight element 201 or on the complementary module 202, with the associated projecting element, that is to say the one which is part of the same pair of assembly elements, being then disposed on the element which does not support the guiding slide 400. In various embodiments envisaged for the apparatus according to the invention, the guiding slides 400 may be disposed on any face whatever of the headlight element 201 or complementary module 202, and may be at the level of the opening 206 where there is one.

When a projecting element 401 slides along a guiding slide 400, it reaches, for example by mechanical abutment, a stop position which corresponds to the final position of the complementary module, that is to say its working position. In the invention it is arranged that, when the complementary module reaches its stop position, the connector 211 enters into its receiving element 210, that is to say the mechanical abutment and the electrical connection are made at the same moment. In order that the electrical connection is effected satisfactorily, various centring means may be disposed in such a way that they act equally at that moment.

In one particular example of an embodiment of the apparatus according to the invention, the guiding slides 400 are disposed inside the headlight element 201 itself, the complementary module being then arranged to be contained in the headlight element 201, which has an advantage in terms of sealing of the apparatus according to the invention.

In another example, the sliding guides 400 become progressively wider in such a way as to brake by friction, and then to stop, at the level of the stop position, the progression of the projecting elements 401. The projecting elements 401 can thus be blocked against movement in the guiding slides 400, thereby being able to maintain the complementary module 201 of the headlight element 201 without making use of additional fastening means.

In order to ensure perfect sealing of the apparatus according to the invention, various seals may be present, such as the following.

A first seal 501 of the lip seal type which can be seen in FIGS. 3 and 5, is disposed in the opening 206 in order to envelop the ballast 202 at the level of its front face, thereby sealing the headlight device 200 from its environment. The first seal 501 may be terminated by a membrane 502 which can be seen in FIG. 3, and which provides sealing between the ballast 202 and the headlight element 201. This membrane 502 may take the form of a second seal dissociated from the first seal 501, preventing any ingress of liquid between the ballast 202 and the headlight element 201 at the level at which the receiving element 210 is fastened, with a clearance, on the headlight element 201.

A third seal 503 can be seen in FIG. 4. It seals the ballast 202 from outside, and it is disposed at the level of a junction between a heat sink 402 which constitutes the lower face of the ballast 202 and the projecting elements 401 arranged on the side walls of the ballast 202. The passage of the conductor wires at the level of the connector 211 and its receiving element 210 is also sealed, for example by means of a gel of a kind that sets after being applied.

It should be noted that in order to guarantee sealing of the module, use may be made of two seals or more than two, with each seal having one or more functions.

In conclusion, the invention reduces to practice a system of assembly between an electronic module and a lighting or indicating apparatus for a motor vehicle, which is extremely advantageous in that:

its mechanical fitting, using a slide system, is very simple;
the simultaneous electrical and mechanical connection of the two components can be ensured in a single operation;
the electronic module is able to have only a single connector, while it is more simple to fit and to change;
many versions are possible.

Thus the electronic module may be secured to the casing of the apparatus on the outside of the latter (which implies a particular need to guarantee its sealing), but it may also be secured within the casing of the apparatus along its inside walls. In the first case, the casing of the lighting or indicating apparatus already guarantees the essential features of the required sealing, which may enable all or part of the sealing means of the gasket type hitherto required to be omitted.

Means are therefore preferably provided for assembling the two components, which comprise means with a slide, together with, optionally:

means for fastening the two components with respect to each other once the fitting step, using the said sliding movement, has finished;
means for centring the two components which can be the same as or additional to the slide means and the fastening means mentioned above, and which will be able to guarantee that the electrical and mechanical connections are correctly established.

A further innovative feature of one embodiment of the invention is that it is possible, at the level of the connector receiving element disposed in the lighting or indicating apparatus, to bring together two leads, one of which (the output lead) is screened while the other one (the input lead) is unscreened.

What is claimed is:

1. Lighting or indicating apparatus for a motor vehicle, comprising a reflector, a light source, a casing which defines a set of faces, comprising side lower and upper faces and an opening formed in at least a portion of a rear side face and in at least part of the lower face, and at least one connector receiving element disposed in an aperture formed in the rear face at the level of the opening, and a lip seal disposed in the opening, wherein the apparatus is adapted to be combined with at least one complementary module with the aid of at least one pair of assembly element comprising a guide slide and a projecting element, the projecting element being adapted to be inserted at least into one end of the slide associated with the projecting element and to slide in the slide, each of the assembly elements of one pair being disposed either on the lighting or indicating apparatus or on the components consisting of the lighting or indicating apparatus and the complementary module, the module having a single electrical connector, and the apparatus having the connector receiving element adapted to receive the connector for the complementary module, and wherein the lip seal contacts the electrical connector of the complementary module and thereby to seal the apparatus.

2. A lighting or indicating apparatus according to claim 1, having two pairs of assembly elements.

3. Lighting or indicating apparatus according to claim 1, wherein each sliding guide is disposed on the lighting or indicating apparatus, each projecting element in one pair of assembly element being disposed on the complementary module.

4. Lighting or indicating apparatus according to claim 1, wherein the complementary module is associated with the apparatus on at least one of the outer and inner walls of the casing of the lighting or indicating apparatus, or on the outer or inner wall of a removable obturating means of the casing.

5. Lighting or indicating apparatus according to claim 1, wherein the complementary module is selected from the group consisting of a ballast of the HID type and a module comprising at least one electronic circuit board for performing at least one function associated with the headlight element.

6. Lighting or indicating apparatus according to claim 5, wherein the electrical connector of the complementary module is situated on a lateral face of the module, which is of approximately parallelepiped form.

7. Lighting or indicating apparatus according to claim 1, wherein the complementary module is provided with at least one projecting element which is an integral part of a casing in the module.

8. Lighting or indicating apparatus according to claim 1, wherein the complementary module is of approximately parallelepiped form, and has two projecting elements which are an integral part of a casing of the module and which take the form of projections on at least part of two opposed edges of the same face of the casing of the module.

9. Lighting or indicating apparatus according to claim 1, wherein the connector and the connector receiving element are so configured as to be in electrical contact once a mating engagement of the slide or slides and the projecting element or elements has been achieved.

10. Lighting or indicating apparatus according to claim 1, wherein the connector receiving element and the connector fit one inside the other when at least one projecting element of one assembly pair is at the end of the projecting element's course of travel in the associated guiding slide.

11. Lighting or indicating apparatus according to claim 1, wherein the complementary module and the lighting or indicating apparatus are fixed together by fastening means once the slide has, or slides have, come into mating engagement with the projecting element or elements, the fastening means being selected from the group consisting of a single screw, means for clipping the complementary module on the lighting or indicating apparatus, and a spring.

12. Lighting or indicating apparatus according to claim 1, wherein at least one of the connector and the receiving element for the connector includes or is associated with means for centering the connector with respect to the connector receiving element in facing relationship and chamfered.

13. Lighting or indicating apparatus according to claim 12, wherein the connector receiving element comprises guide pins or the use of two guiding slides.

14. Lighting or indicating apparatus according to claim 1, wherein the guiding slides are disposed on the walls of the lighting or indicating apparatus which define the opening.

15. Lighting or indicating apparatus according to claim 1, comprising a seal disposed between a heat sink, which constitutes a lower portion of the complementary module, and a cap element of the complementary module.

16. Lighting or indicating apparatus according to claim 1, comprising a single power supply input for receiving a set of signals from outside the lighting or indicating apparatus, the signals being transmitted via a first conductive link to the receiving element of the connector, a second conductive link internal to the lighting or indicating apparatus, for ensuring the transmission of signals between the receiving element of the connector and a high tension module associated with the lighting or indicating apparatus.

17. Lighting or indicating apparatus according to claim 16, wherein the first conductive link comprises an unscreened lead, and the second conductive link comprises a screened lead.

18. An electronic module for a motor vehicle lighting or indicating apparatus according to claim 1, of the type consisting of a ballast or an element containing at least one electronic circuit board for performing at least one function associated with the headlight, a heat sink, and a cap element, the module having a single connector and a seal disposed between the heat sink and the cap element.

19. A module according to claim 18 in the approximate form of a parallelepiped, the single connector being disposed on one of the side faces of the parallelepiped.

20. A module according to claim 18, in the approximate form of a parallelepiped and provided with at least one projecting element which is an integral part of the casing of the module.

21. A module according to claim 20, wherein two projecting elements are an integral part of the casing of the module, and which are in the form of lugs on at least a portion of two opposed edges of a common face of the casing of the module.

22. A motor vehicle equipped with a lighting or indicating apparatus according to claim 1.

23. Lighting or indicating apparatus according to claim 1 further comprising at least one opening formed in at least one of the faces and having removable obturating means.

24. Lighting or indicating apparatus according to claim 23, comprising a seal disposed in the opening in order to come into partially enveloping relationship with the receiving element of the connector, and thereby to seal the joint between the lighting or indicating apparatus and complementary module.

25. A method of assembling a lighting or indicating apparatus comprising a reflector, a light source, a casing which defines a set of faces, comprising side lower and upper faces and an opening formed in at least a portion of a rear side face and in at least part of the lower face, and at least one connector receiving element disposed in an aperture formed in the rear face at the level of the opening, and a lip seal disposed in the opening and at least one complementary module comprising a single electrical connector, the method comprising: providing at least one pair of assembly elements comprising a guiding slide and a projecting element, the projecting element being adapted to inserted at least into one end of the slide associated with the projecting element and the slide in the slide, each of the assembly elements of one pair being disposed either on the lighting or indicating apparatus or on the complementary module, each assembly element in one said pair being dispose din a different one of the components consisting of the lighting or indicating apparatus and the complementary module, inserting the connector receiving element of the apparatus into the connector of the complementary module so that the lip seal contacts the electrical connector of the complementary module and thereby to seal the apparatus, wherein, as the module and the lighting or indicating apparatus are being assembled together, their mechanical and electrical connections are made simultaneously.

* * * * *

UNITED STATES PATENT AND TRADEMARK OFFICE
CERTIFICATE OF CORRECTION

PATENT NO. : 7,172,316 B2
APPLICATION NO. : 10/635358
DATED : February 6, 2007
INVENTOR(S) : Marc Duarte It is certified that error appears in the above-identified patent and that said Letters Patent is hereby corrected as shown below:

Column 8:

Line 20, after "201" insert --.--

Line 21, delete "clement" and insert --element--.

Line 23, delete "power 10" and insert --power to--.

Line 64, delete "or" and insert --of--.

Column 9:

Line 1, delete "On" and insert --on--.

Column 10:

Line 48, delete "element" and insert --elements--;

Line 48, delete "guide" and insert --guiding--;

Line 54, before "components consisting," insert -- complementary module, each assembly element in one said pair being disposed in a different one of the components--;

Line 58, delete "for" and insert --of--.

UNITED STATES PATENT AND TRADEMARK OFFICE
CERTIFICATE OF CORRECTION

| | | |
|---|---|---|
| PATENT NO. | : 7,172,316 B2 | |
| APPLICATION NO. | : 10/635358 | |
| DATED | : February 6, 2007 | |
| INVENTOR(S) | : Marc Duarte | |

It is certified that error appears in the above-identified patent and that said Letters Patent is hereby corrected as shown below:

Column 12:

Line 49, after "adapted to" insert --be--;

Line 51, delete "and the" and insert --and to--;

Line 55, delete "dispose din" and inset --disposed in--.

Signed and Sealed this

Third Day of April, 2007

JON W. DUDAS
*Director of the United States Patent and Trademark Office*